United States Patent [19]
Vilkomerson

[11] Patent Number: 5,488,953
[45] Date of Patent: Feb. 6, 1996

[54] DIFFRACTING DOPPLER-TRANSDUCER

[75] Inventor: David Vilkomerson, Princeton, N.J.

[73] Assignee: EcoCath, Inc., Princeton, N.J.

[21] Appl. No.: 228,578

[22] Filed: Apr. 15, 1994

[51] Int. Cl.[6] .............................. A61B 8/06; H01L 41/04
[52] U.S. Cl. .................. 128/661.08; 128/662.03; 310/334
[58] Field of Search .................. 128/660.07, 661.01, 128/661.07–661.1, 662.03–662.04, 662.06; 73/861.25; 310/334–335

[56] References Cited

U.S. PATENT DOCUMENTS

| | | | |
|---|---|---|---|
| 4,075,516 | 2/1978 | Hattori et al. | 310/334 |
| 4,142,412 | 3/1979 | McLeod et al. | 73/861.25 |
| 4,375,767 | 3/1983 | Magori | 73/861.18 |
| 5,295,487 | 3/1994 | Saitoh et al. | 128/662.03 |
| 5,305,758 | 4/1994 | Dietz et al. | 128/662.06 |

*Primary Examiner*—Francis Jaworski
*Attorney, Agent, or Firm*—Plevy & Associates

[57] ABSTRACT

An ultrasonic transducer apparatus of variable frequency including a diffracting structure adapted for emitting and receiving a plurality of diffracted ultrasonic beams of calculable different angles for determining the velocity of a fluid flowing through a lumen, and flow volume. Velocity and flow volume are determined from at least two equations in the two unknowns of the velocity, and the angle between the ultrasonic transducer apparatus and the direction of the fluid flow, and from a determination of the diameter of the lumen.

20 Claims, 5 Drawing Sheets

(PRIOR ART)

DIFFRACTING DOPPLER-TRANSDUCER

FIELD OF THE INVENTION

The present invention relates to ultrasonic transducers and more particularly to a special ultrasonic transducer employing diffraction to produce multiple beams that, using Doppler measurement techniques, can determine the velocity of a fluid flowing through a vessel independently of the transducer orientation.

BACKGROUND OF THE INVENTION

There exists in medicine an important and continuing need to be able to determine the velocity of a fluid under investigation, particularly blood, which flows through a vessel or through connected instrumentation. Conventional ultrasonic transducers employing Doppler measurement techniques are commonly used for this purpose. See Atkinson and Woodcock, *Doppler Ultrasound and Its Use In Clinical Measurement*, Academic Press, London (1982). "Doppler" is used here in the broad sense to describe all the techniques for measuring the variation with time of backscattered ultrasound along a beam to determine the velocity component along the beam. These methods include what is conventionally considered Doppler—i.e., the change in phase of backscattered ultrasound as a result of movement—as well as newer time-domain methods that use cross-correlation to determine the velocity along the beam, see Hocks et al, "Comparison of the Performance of the RF Cross-Correlation and Doppler Auto-Correlation Technique to Establish the Mean Velocity", in *Ultrasound in Medicine and Biology* 19, page 727 (1993). All such methods measure the velocity component along the beam. To determine true fluid velocity, which is the subject of this invention, requires the correction for angle between the beam and the velocity vector. The results for cross-correlation methods, as well as for the Doppler methods, will depend upon the frequency in use. As will be shown, the angle of the beam from the transducer structure disclosed will also vary with the frequency used. For all such methods, one can obtain two equations, relating the measured effects of changing frequency in terms of the observed velocity and angle, and then determine both velocity and angle between the measuring ultrasound beam and the velocity vector. For ease of use herein, reference to the term "Doppler" will signify reference to all methods that use time variation of the backscattered ultrasound along a beam to measure the velocity of a fluid at an unknown angle to the beam.

Ultrasonic transducers are devices which convert energy between electrical and acoustic forms. See L. Kinsler et al., *Fundamentals of Acoustics*, John Wiley & Sons (3d ed. 1982). By directing an insonifying beam of ultrasonic energy towards a fluid under investigation at a known angle, and by then measuring the frequency shift of the backscattered ultrasound energy, the velocity of the fluid under investigation can be determined. This is because the Doppler shift in frequency is proportional to the component of the velocity vector that is parallel to the insonifying beam. The well-known equation for finding the velocity v of the fluid from the Doppler shift frequency $f_d$ is $$v = .5 \cdot f_d \frac{c}{f \cdot \cos \theta} \quad (1)$$

where c is the velocity of sound in blood, f is the frequency of the insonifying beam and $\theta$ is the angle between the insonifying beam and velocity vector.

A problem commonly encountered when employing conventional Doppler techniques to measure the velocity v of a fluid under investigation is that typically the insonifying beam insonifies the fluid flow at an unknown angle. Without knowledge of the angle, equation (1) cannot be solved. Therefore, in such situations, employing a single insonifying beam to determine the velocity of the fluid of interest from equation (1) is impossible since there are two unknowns in the single equation (1), the velocity v and the angle $\theta$.

One method of eliminating the foregoing problem of determining the angle $\theta$ in question has been to employ two transducers at a known angular offset of $\pm\alpha$ and to insonify the fluid under investigation at the respective angles of $\theta+\alpha$ and $\theta-\alpha$, thus allowing the two following equations (2) in the two unknowns v and $\theta$ to be written, and by solution of two equations in two unknowns, permitting v to be determined regardless of the value of $\theta$:

$$v = .5 \cdot f_{d1} \frac{c}{f \cdot \cos(\theta+\alpha)} \quad v = .5 \cdot f_{d2} \frac{c}{f \cdot \cos(\theta-\alpha)}, \quad (2)$$

see Overbeck et al, "Vector Doppler: Accurate Measurement of Blood Velocity in Two Dimensions", *Ultrasound in Medicine and Biology*, Volume 18, page 19 [1992]). However, using two conventional transducers at two angles to the fluid flow is difficult, as transducers are thick, inflexible, bulky, difficult to implant, and too big to be useful on a catheter or a guidewire. Thus, use of pairs of transducers, while possible, is rare.

Figure 1:
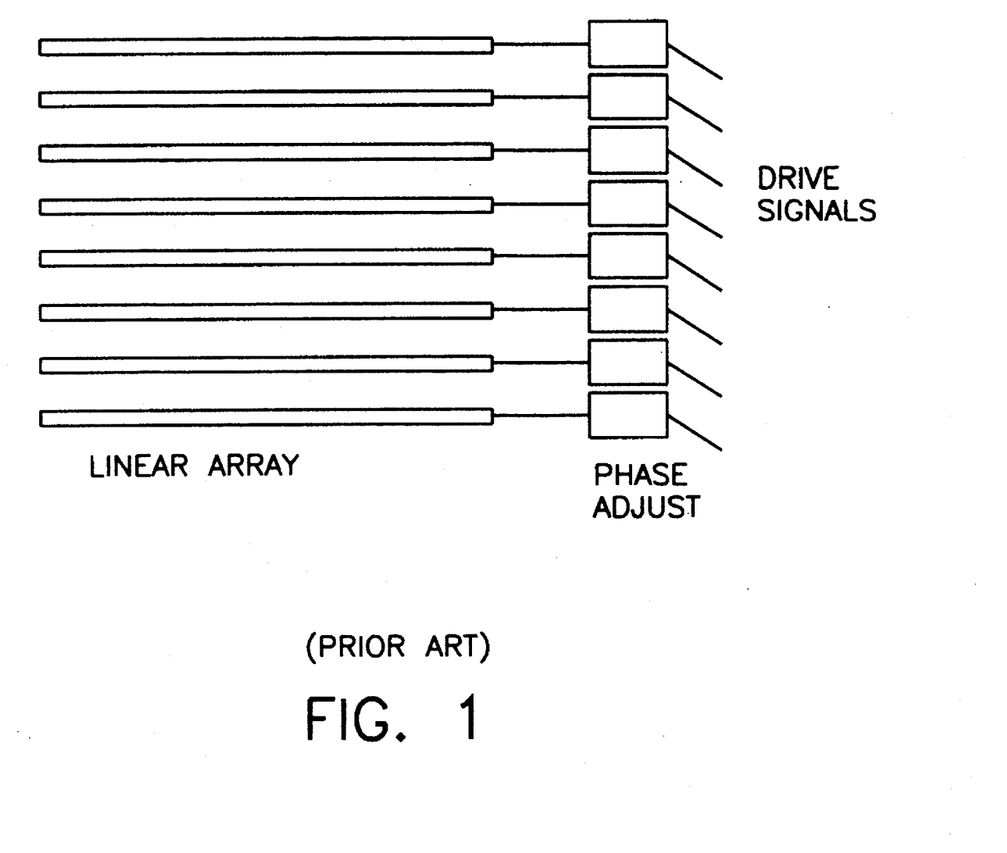
FIG. 1 shows a conventional (prior art) ultrasonic transducer.

Conventional phased-array ultrasound transducers used for diagnostic imaging are all essentially configured as an array of linear elements. A major problem with these conventional transducers is their complexity—as shown in FIG. 1, each of the linear transducers that compose the array has its own connection and driver. These are necessary for the phase adjustment needed to focus and steer the beam the array produces. In the case of what is known in the art as a linear array, only certain groups of elements at a time are connected in parallel; these elements act as one uniform transducer and produce one beam, which is scanned by changing which group of array elements are connected. Operationally, conventional phased array and linear array transducers suffer the drawback of requiring many signal cables to operate, either to connect to each element or to connect to groups of elements.

Most conventional phased array ultrasound transducers operate by generating a single beam which is scanned over an angular sector of beam positions. Reflections are obtained at a multitude of beam locations to determine velocity of a fluid being targeted. Other imaging systems are presently available which operate by generating multiple beams from a phased array transducer, by using superposition of the driving patterns for each beam. For example, U.S. Pat. No. 5,105,814 discloses a method of transforming a multi-beam ultrasonic image in which a plurality of ultrasonic beams are simultaneously transmitted into an object. This method does not employ a Doppler measurement technique to arrive at a velocity of a fluid. Moreover, these multibeam systems also suffer from the problem of requiring a multitude of transducer elements, phase delays, and cables, resulting in a complex and bulky configuration.

Diffraction is well-known in optics as a way to produce multiple optical beams based on the interference effects of waves. Likewise, it is conceivable to use diffraction principles in ultrasound as a way to produce multiple ultrasonic beams for performing Doppler measurements of the velocity of blood or other fluids. The conventional phased array ultrasound transducer configuration of an array of linear elements may appear similar to the appearance of a diffracting structure (of which the present invention relates to). However, these conventional transducers operate based on a totally different principle as compared to the diffraction principle of the present invention.

It is therefore an object of the present invention to provide a single transducer that is able to produce multiple insonifying beams at known and controllable angles by employing diffraction principles, thus permitting the absolute velocity of a fluid under investigation to be determined using Doppler measurement techniques.

It is a further object of the present invention to provide such a transducer which is thin, flexible and easy to implant, and which eliminates the need for multiple cables and elements as required by the prior art.

SUMMARY OF THE INVENTION

An ultrasonic transducer apparatus of fixed or variable frequency including a diffracting structure adapted for emitting and receiving a plurality of diffracted ultrasonic beams at known angles for determining the velocity of a fluid flowing through a lumen of a given diameter by providing at least two equations in the two unknowns of the velocity and the angle between the ultrasonic transducer apparatus and the direction of the fluid flow. The diffracting structure also being adapted, by varying the excitation of the ultrasonic transducer apparatus, to emit and receive a non-diffracted ultrasonic beam for measuring the diameter of the lumen and thus determining the absolute flow volume of the fluid flowing through the lumen.

DETAILED DESCRIPTION OF THE INVENTION

The present invention relates to an apparatus and a method of producing multiple beams from a single transducer at known and controllable angles to each other and to the transducer. The method uses diffraction, an effect that is based on the interference effects of waves. By using these multiple beams at known angles, Doppler measurements of blood (or other back-scattering fluids) can be obtained independently of the angle between the transducer and the velocity vector of the fluid.

As an example of diffraction, if an absorbing comb-like structure is placed in the propagation path of a plane-wave producing transducer (which could be piezoelectric, magnetostrictive, or electromechanical in operation), multiple beams will appear above the structure. In optical diffraction, one would use what is well known as a "diffraction grating" to produce the multiple beams. The present invention, however, relates to the use of multiple beams of ultrasound energy. These beams may be produced by positioning an acoustic structure in the wave path of the transducer, with a rubber absorber of parallel lines acting like an optical diffraction grating, to produce diffracted ultrasound beams.

However, if one were to use an absorbing structure, approximately half of the ultrasound energy is absorbed. It is therefore more efficient to actually structure the transducer to produce the same pattern of thin stripes of energy produced by the blocking "grating". (As will be seen, structuring the transducer as the diffracting structure leads to other advantages such as flexibility of beam patterns produced, etc.)

One example of structuring the transducer would be the electroding of a piezoelectric transducer so that only portions of the material would be energized. Putting on stripe electrodes would, as is well-known in optical diffraction, produce stripes of emission producing the same sort of diffracted beams as would a blocking "grating". The known principles of diffraction, such as the angle and relative energy of the beams produced, can be applied to the acoustic energy distribution of a transducer with a diffracting structure. The diffracting structure may be a structure overlying a plane-wave transducer, or may be transducer whose construction leads to diffracted beams.

Figure 2:
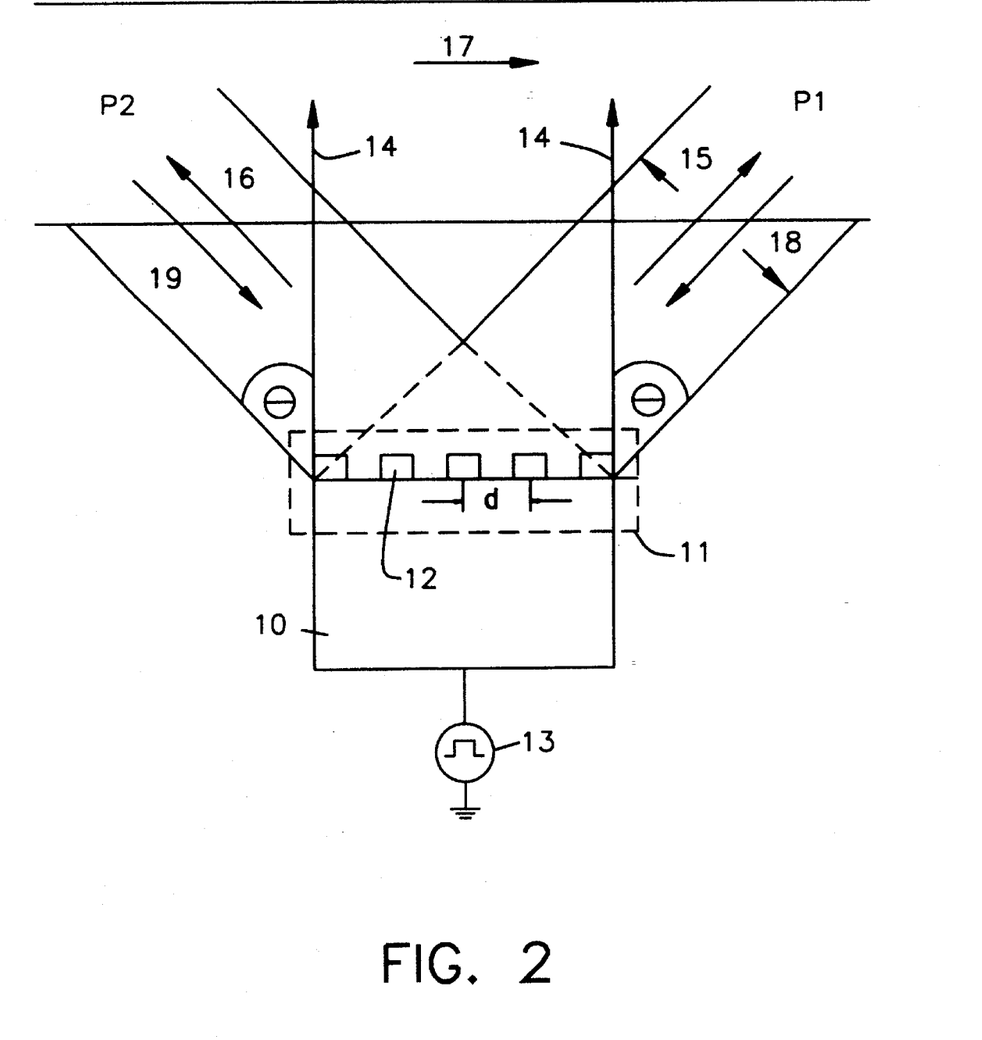
FIG. 2 shows an exemplary embodiment of the transducer which is the object of this invention.

Referring to FIG. 2 there is shown a Diffracting Doppler Transducer (DDT) 10 which is the object of the present invention. The DDT 10 includes a grating-like-structure 11 comprised of an array of line transducer elements 12 which are separated from one another by a distance d. The DDT 10 is excited by a pulse generator 13. The DDT 10 can also be excited by any other conventional source of power.

The DDT 10 operates in a manner analogous to an optical diffraction grating. See Born & Wolf, *Principles of Optics* at pp. 401–414, Pergamon Press, Oxford (3d ed. 1964). An optical transmission diffraction grating consists of a series of transparent lines on an opaque sheet. Such a grating permits a portion of an impinging light beam to pass as a non-diffracted beam, while diffracting another portion of the impinging beam into two diffracted beams at equal angles to the impinging beam of $\pm\theta$ where $$\theta = \arcsine\left(\frac{\lambda}{d}\right) \quad (3)$$

and where $\lambda$ is the wavelength of the impinging light and d is the spacing of the transparent lines. As is well-known in the art, diffraction is caused by the interference of waves from the multiple sources in the diffracting structure. See Born & Wolf, supra.

By being constructed like a grating 11, the DDT 10 produces three insonifying beams-non-diffracted beam 14, and diffracted beams 15 and 16. Diffracted beams 15 and 16 are produced at the respective angles of $\pm\theta$ to non-diffracted beam 14 (which is perpendicular to the DDT 10), where $\theta$ is determined by equation (1), and $\lambda$ is equal to c/f, where c is the velocity of propagation in the fluid and f is the frequency of excitation.

Diffracted beams 15 and 16 are directed towards a moving fluid 17 under investigation. Beam 15 insonifies the fluid 17 at a first point P1 and beam 16 insonifies the fluid 17 at a second point P2. The fluid 17 backscatters the diffracted beams 15 and 16 back towards the DDT 10 as backscattered diffracted beams 18 and 19, respectively. By measuring the frequency shift of the reflected beams 18 and 19, one can determine the velocity v of the fluid 17 using two equations (2), as described above.

Changing the frequency of excitation of the DDT 10, i.e., changing the ratio of $\lambda$ to d, changes the angle between beams 14, 15 and 16. Beams 14, 15 and 16 are produced by the DDT 10 with calculable and equal angles between the beams, as per equation (3).

Unlike multitransducer systems, only a single DDT 10 is required to produce multiple insonifying beams 15 and 16. Thus, the need for multiple transducer elements and signal cables is eliminated, inasmuch as the DDT 10 requires at most two cables. The DDT 10 is able to determine the velocity v of the fluid 17 from two equations in two unknowns, regardless of the angle θ, without having to employ multiple transducers. In addition, the operating frequency of the DDT 10 can be varied, changing the angle of the beams 15 and 16 so that the velocity of the fluid 17 can be determined several ways, thereby providing a means for checking the accuracy of the value obtained for the velocity v.

Figure 3:
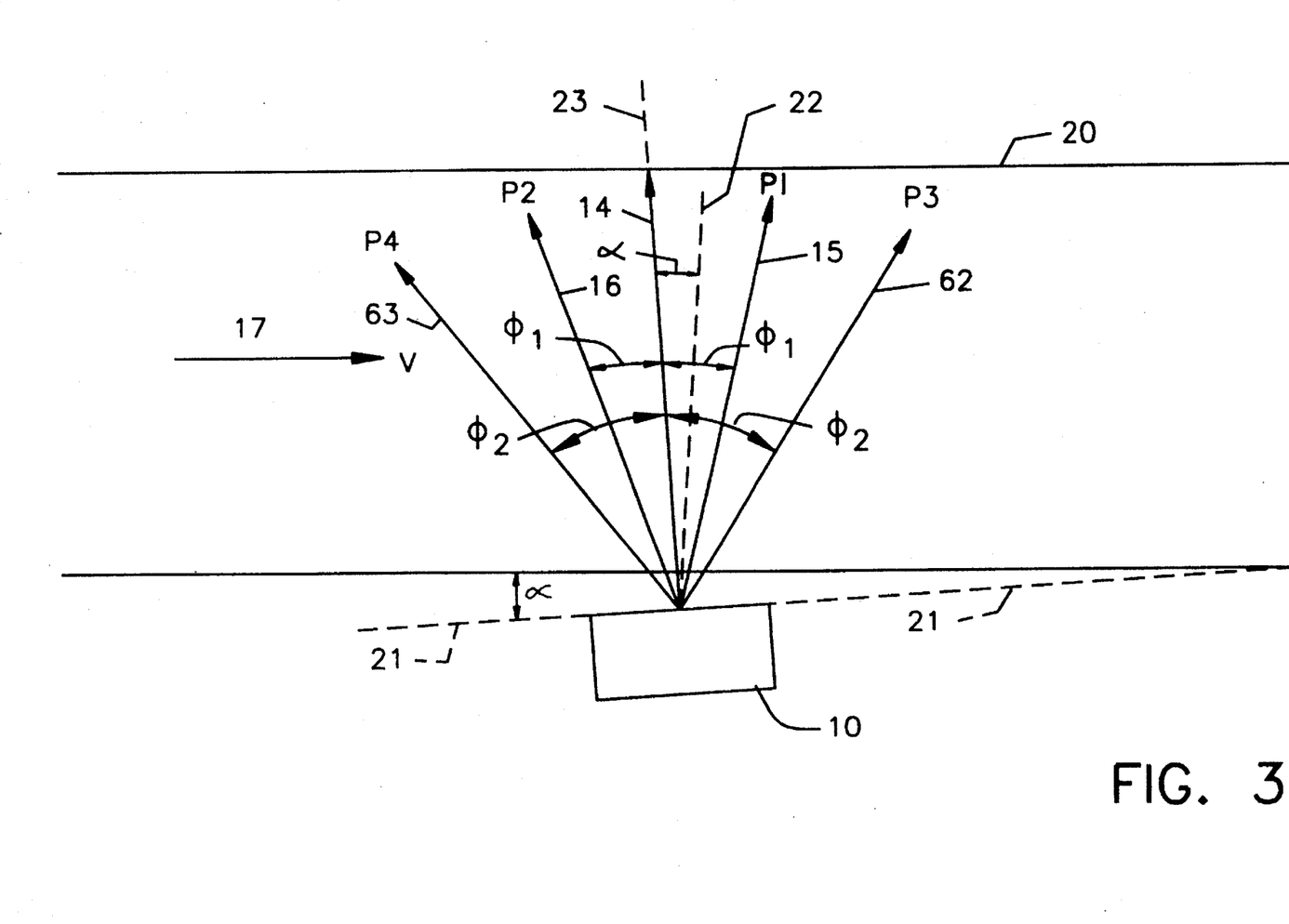
FIG. 3 shows a schematic representation of the transducer shown in FIG. 2.

Referring to FIG. 3 there is shown a schematic representation of the DDT 10 attached to a blood vessel 20 at an arbitrary angle α to the flow velocity v. (Plane 21 is shown parallel to DDT 10 at angle α from blood vessel 20). An angle φ (equal to $\phi_1$, as shown) represents the angle of the diffracted beams 15 and 16 from a perpendicular 23 to the DDT 10, both positively to the right and negatively to the left of the perpendicular 23. Non-diffracted beam 14 is shown in line with perpendicular 23 at angle α to a perpendicular 22 to the flow velocity v.

Employing the DDT 10 allows the following equations to be written to determine the velocity v of the fluid 17:

$$v = .5 \cdot \frac{f_{d1}}{f \cdot \sin(\phi + \alpha)} \text{ and } v = .5 \cdot \frac{f_{d2}}{f \cdot \sin(\phi - \alpha)} \quad (4)$$

$$\text{where } \sin(\phi) = \lambda/d = \frac{c}{fd} \quad (5)$$

and where c is the velocity of propagation, f is the frequency of the insonifying beam, $f_{d1}$ is the Doppler shift frequency measured from reflected beam 18, $f_{d2}$ is the Doppler shift frequency measured from reflected beam 19, and d is the spacing between the grating elements. From equation (4), the velocity of interest and angle can be uniquely determined from the Doppler shift frequencies and from the operating frequency of the DDT 10.

Using broad-band ultrasound transducers, well-known to those skilled in the art, permits the frequency f of the insonifying beam to be varied by varying the frequency of the voltage applied to the transducer. Use of a broad-band transducer allows the following set of equations to be written to determine the velocity v of the fluid 17:

$$v = .5 \cdot \frac{f_{d1}}{f_1 \cdot \sin(\phi_1 + \alpha)} \text{ and } v = .5 \cdot \frac{f_{d3}}{f_2 \cdot \sin(\phi_2 + \alpha)} \quad (6)$$

$$\text{where } \phi_1 = \sin^{-1}\left(\frac{c}{f_1 \cdot d}\right) \text{ and } \phi_2 = \sin^{-1}\left(\frac{c}{f_2 \cdot d}\right) \quad (7)$$

where $f_1$ and $f_2$ are two distinct frequencies of excitation of the DDT 10. Frequency $f_1$ generates diffracted beams 15 and 16 at angles $\phi_1$ from the perpendicular 23; frequency $f_2$ generates diffracted beams 62 and 63 at angle $\phi_2$ from the perpendicular 23, which insonify the fluid 17 at points P3 and P4, respectively, as shown in FIG. 3. A Doppler shift frequency $F_{d3}$ is measured from backscattered energy from beam 62. Thus there are two equations, (6) and (7) in two unknowns, v and d. To accurately determine the velocity v of interest using equation (4) requires that the fluid 17 being measured not change velocity between the two different positions P1 and P2 where positively displaced beam 15 and negatively displaced beam 16, respectively, insonify the fluid 17. In general this will be true, as for example where the measurement is being made in a blood vessel 10 mm across and the difference between the points of measurement is on the order of 10 mm, assuming that the angle φ is 30 degrees. Typically, the velocity of fluids does not change over a 10 mm path. However, if because of curvature of the vessel, i.e. , stenosis, there is a rapid change in velocity, it becomes more accurate to use two or more frequencies $f_1$ and $f_2$, etc. of excitation to narrow the spatial difference in positions of insonification. Thus, in the above example, there will be only a few mm difference between the two positions P1 and P3 (see FIG.3), as opposed to 10 mm between P1 and P2. Thus equation (6) may provide a more accurate determination of the velocity than does equation (4) because equation (6) minimizes the difference in the spatial position where the fluid velocity is measured. In addition, equation (6) permits one to determine the velocity of the fluid under investigation regardless of velocity changes between points P1 and P2.

Fabricating the DDT 10 from a plastic piezoelectric material such as PVF2 and its polymers, see Brown, L., *Piezoelectric Polymer Ultrasound Transducers for Nondestructive Testing*, Proceedings of ASNT Fall Conference, Valley Forge, Pa., Oct. 9–13, 1989, permits the fabrication of a transducer which is not only light, flexible and inexpensive, but which is capable of operating in a manner analogous to an optical phase diffraction grating rather than a transmission grating. (Of course any piezoelectric material may be used in a phase-diffraction-grating mode). Phase diffraction gratings are optical devices that utilize phase shift to modulate light so that more of an impinging optical beam goes into the diffracted beams. See Born & Wolf, supra. Phase diffraction gratings permit 100% of an impinging light beam to be directed into the diffracted beams as compared to a maximum of 50% of an impinging beam being directed into the diffracted beams when a transmission grating is employed. Similarly, Diffracting Doppler Transducers using the technique described below can put all of their emitted ultrasound beam energy into the diffracted beams.

Figure 4:
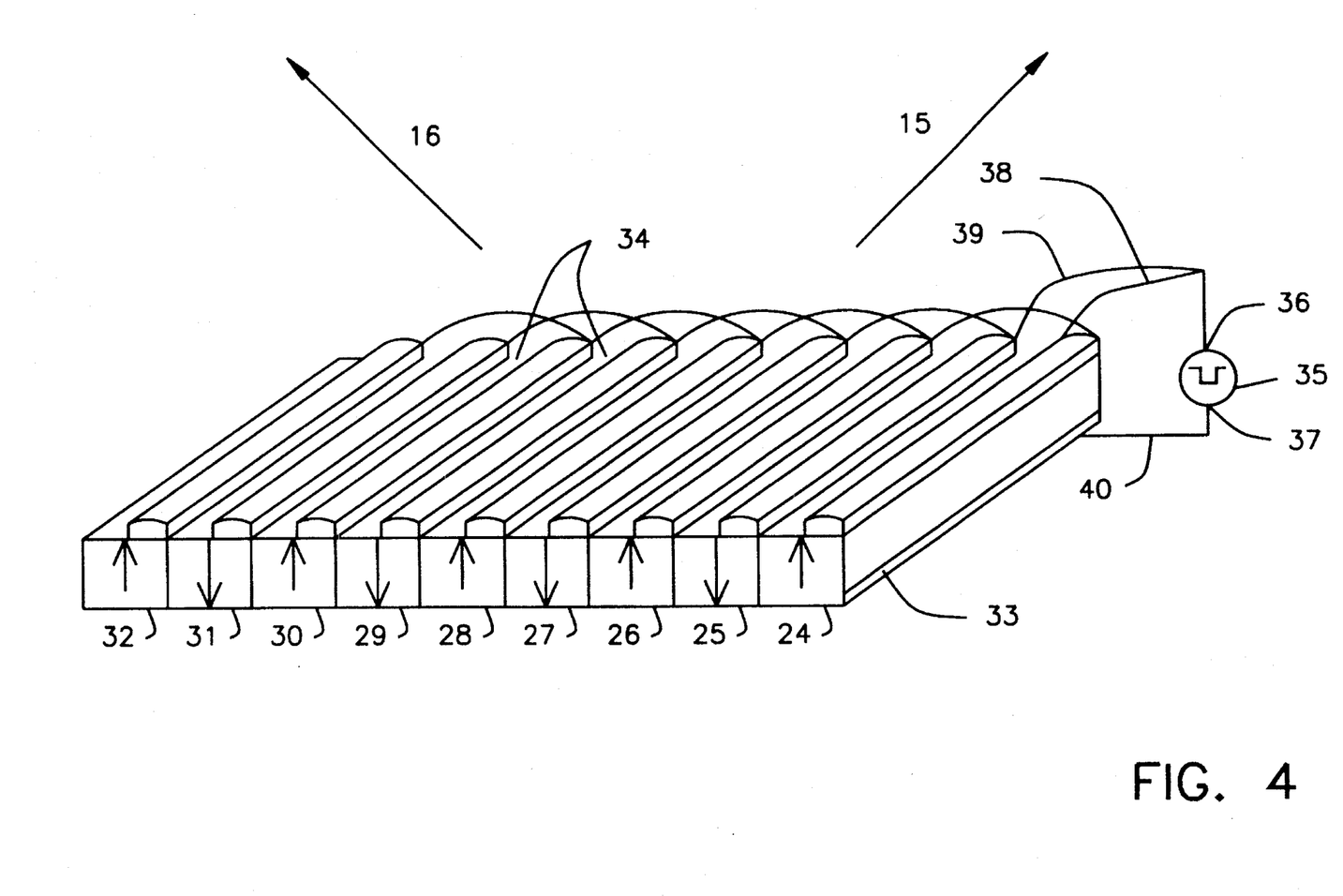
FIG. 4 shows a second embodiment of the transducer which is the object of this invention coupled to a single source of reference potential.

Referring to FIG. 4 there is shown a preferred embodiment of a DDT 23 fabricated from alternately polarized strips 24–32 of PVF2 piezoelectric material. Strips 24, 26, 28, 30 and 32 are positively polarized as indicated by the upward direction of the arrows in FIG. 4. Strips 25, 27, 29 and 31 are negatively polarized as indicated by the downward direction of the arrows in FIG. 4. Alternately polarized strips 24–32 form the grating 11 referred to in the description of FIG. 2. Alternately polarized strips 24–32 are formed upon a common substrate surface 33 of PVF2 by conventional photolithographic techniques. Surface 33 forms the ground plane of the DDT 23. The distance from the middle of strip 24 to strip 26, i.e. one spatial period of the diffracting pattern, is equivalent to the distance d of FIG. 2 and in equation (1). For example, at 5 MHz, λ is 0.3 millimeters in blood, so for operating the DDT with beams at 45°, d should then be 1.414 wavelengths, from equation (1). Therefore, the center to center distance of strip 24 to 26 should be 0.424 millimeters (17 mils), with each strip about 8 mils wide and with 0.5 mils between each strip.

By utilizing the capability of piezoelectric materials to be either positively or negatively polarized, the strips 24–32 of the DDT 23 can be excited as shown in FIG. 4, thus enabling the DDT 23 to operate in a high-diffracting mode, with the grating 11 being analogous to a phase diffraction grating, such that 100% of the acoustic energy produced by the DDT 23 is directed into diffracted beams 15 and 16.

In FIG. 4, alternately polarized strips 24–32 are excited with the same polarity so that the alternately polarized strips move in opposite directions, thus producing diffracted beams 15 and 16. A negative pulse generator 35 having a first terminal 36 and a second terminal 37 excites the strips 24–32 of the DDT 23. Terminal 36 is coupled via lead 38 to strip 24, and is also coupled via lead 39 to strip 25. Terminal 37 is coupled via lead 40 to the ground plane 33. Positively polarized strips 24, 26, 28, 30 and 32 are coupled together as shown in FIG. 4. Similarly, negatively polarized strips 25, 27, 29 and 31 are also coupled together as shown in FIG. 4. Negative pulse generator 35 excites the positively polarized strips 24, 26, 28, 30 and 32 negative, and excites the negatively polarized strips 25, 27, 29 and 31 positive. Alternatively, if a positive pulse were provided to the DDT 23, the positively polarized strips 24, 26, 28, 30 and 32 would be excited positively, and the negatively polarized strips 25, 27, 29 and 31 would be excited negatively, and move in opposite directions.

Figure 5:
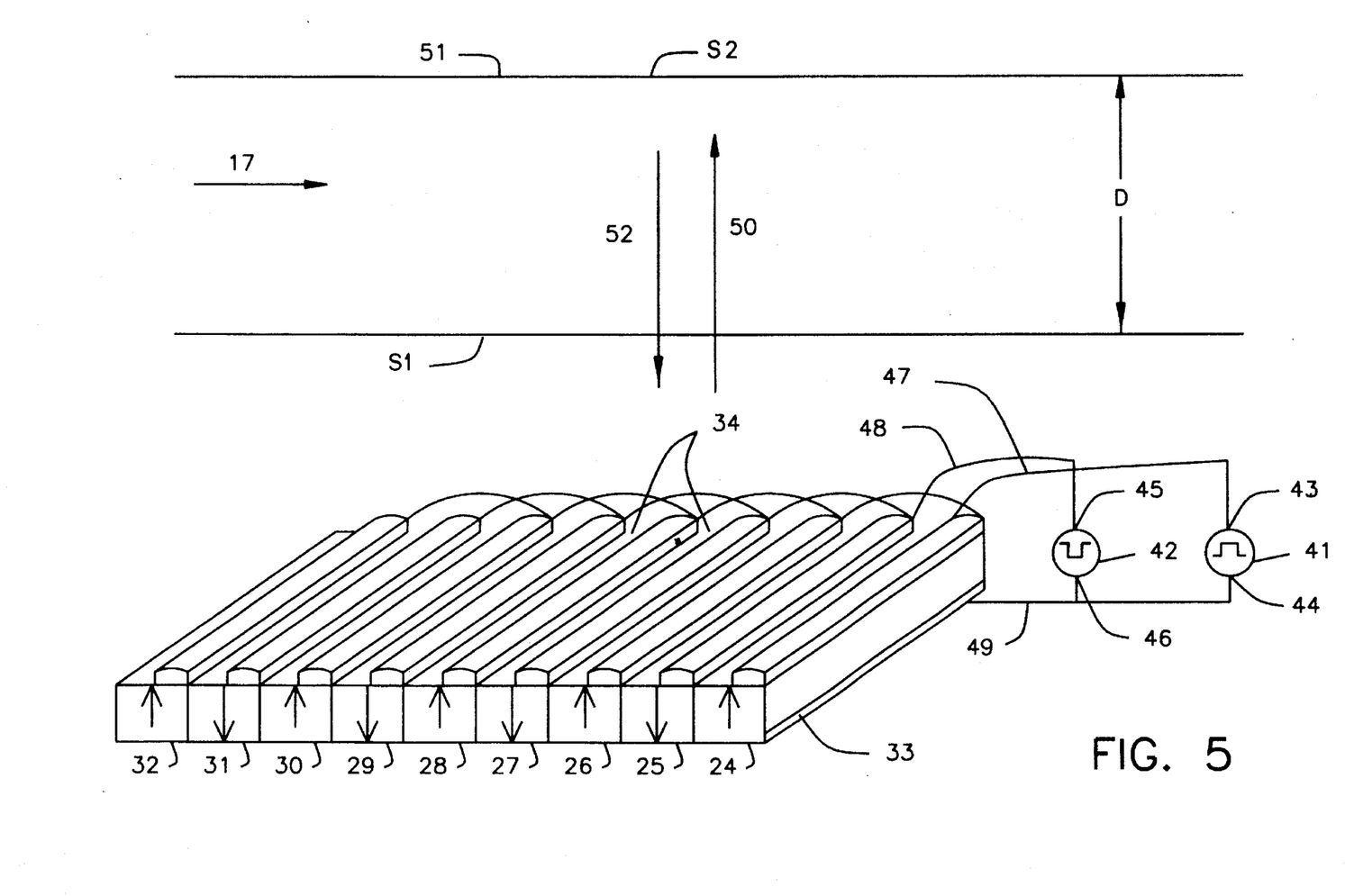
FIG. 5 shows the transducer shown in FIG. 4 coupled to two sources of reference potential.

FIG. 5 shows the DDT 23 shown in FIG. 4 in a non-diffracting mode. Numerals used in FIG. 4 are employed in FIG. 5 to denote identical parts. Positively polarized strips 24, 26, 28, 30 and 32 are coupled together as shown in FIG. 5. Similarly, negatively polarized strips 25, 27, 29 and 31 are also coupled together as shown in FIG. 5. Positive pulse generator 41 and negative pulse generator 42 excite the alternately polarized strips 24–32 of the DDT 23. Pulse generator 41 has a first terminal 43 and a second terminal 44. Likewise, pulse generator 42 has a first terminal 45 and a second terminal 46. Terminal 43 is coupled via lead 47 to strip 24, terminal 45 is coupled via lead 48 to strip 25, and terminals 44 and 46 are coupled via common lead 49 to the ground plane 33. Pulse generator 41 excites the positively polarized strips 24, 26, 28, 30 and 32 positive, while pulse generator 42 excites the negatively polarized strips 25, 27, 29 and 31 positively. The alternately polarized strips 24–32 are thus all excited positively such that all the strips 24–32 move together producing a single non-diffracted beam 50 as shown in FIG. 5. Alternatively, if the positive pulse generator 41 were to excite the negatively polarized strips 25, 27, 29 and 31, and the negative pulse generator 42 were to excite the positively polarized strips 24, 26, 28, 30 and 32, then all the strips 24–32 would be negatively excited and move together.

By measuring the diameter D of a lumen 51 through which the fluid 17 flows, the DDT 23 can determine the absolute flow volume, which is the product of the average velocity times the area of the flow, i.e. $v \times \pi/(D/2)^2$. To measure the diameter D, the DDT 23 is biased as is shown in FIG. 5, so that the non-diffracted beam 50 is produced. Non-diffracted beam 50 is emitted by the DDT 23 from one side S1 of the lumen 51 towards an opposite side S2 of the lumen 51. Opposite side S2 reflects non-diffracted beam 50 back towards the side S1 as reflected non-diffracted beam 52, thereby enabling the DDT 23 to measure the diameter D of the lumen 51.

The distance measured to the opposite side of the lumen 51 is the diameter D multiplied by the cosine of the angle $\alpha$. (The velocity vector is parallel to the lumen axis). The angle $\alpha$ can be determined from either equation (4) or (6) so that the diameter D and the velocity v, as derived from the spectrum of the Doppler frequency when the lumen 51 is insonified over its whole area, gives the volume flow.

In the preferred embodiment of the DDT 23, the three leads 38, 39 and 40 or 47, 48 and 49, are extracted through the skin for short-term monitoring, or attached to a telemetry device that transmits the measured data to a receiver, such instruments being well-known in the art. The DDT 23 can operate in either the hi-diffracting mode to determine the velocity v of the fluid 17, or in the non-diffracting mode to measure the diameter D of the lumen 51, or in some combination, if desired, of out-of-phase and in-phase operation to simultaneously determine both the velocity v and the diameter D.

The accuracy of the determination of the velocity v of the fluid obtained using equation (6) may be increased by determining the velocity v at more than two frequencies f. These frequencies can be used either sequentially or simultaneously, depending upon he signal-noise ratio obtainable for the particular situation. In general, the standard FFT-type Doppler signal analyzers usually employed for spectral analysis will provide good operation for the DDT 23.

A continuing medical need is the ability to measure the blood flow through a replacement vessel, such as a graft. A commonly encountered problem is attempting to measure the flow after the graft forming the replacement vessel has closed up. A DDT such as the structure shown in FIGS. 4 and 5 could easily be sewn onto the outside surface of such a graft as shown in FIG. 3. Such a DDT is approximately 2.0 centimeters long and about 0.6 mm thick, so that the center of the half-wave resonance of such a DDT is about 15 MHz. For the nominal diffracted beam to be at 45 degrees, as shown in FIG. 2, the spacing of the grating is 1.414 wavelengths. $\lambda$ is 0.1 mm in blood at 15 MHz. Therefore, electrodes of the same polarity are separated by 0.14 mm, or 5.6 mils. The structure has 2.4 mil strip electrodes on 2.7 mil spacing. Such a structure is fabricated by standard photolithographic techniques which can be used with PVF2. In general the ratio of strip spacing to wavelength should be 0.05 to about 1 times the wavelength of ultrasound used, corresponding to a 3° to 90° diffracted angle. Thin wires are connected to the graft and extracted through the skin for short-term monitoring, or attached to a telemetry device that would transmit the measured data to a receiver for longer monitoring periods.

To measure the flow of blood through an artery, rather than try to line up the Doppler insonifying beam with the flow axis, a DDT such as is shown in FIGS. 4 and 5, could be positioned onto a guidewire in the form of bands around a catheter. These bands would produce a cone set of insonifying beams that would permit the blood flow to be measured.

In the event that a larger surface area is needed to obtain a good signal for determining the velocity v, a DDT such as is shown in FIGS. 4 and 5 could be deployed on the end of a guidewire. Such a flow-measuring guidewire would be pushed by the blood flow towards a wall of a lumen where the flow volume could be measured. Such a structure would have a minimal effect on the flow volume being measured and could be used to monitor bodily systems such as the circulatory system.

The DDT structure can be used in conventional pulsed send-receive mode or in continuous-wave mode. As with conventional Doppler transducers, continuous mode may be implemented by using one portion of the transducer for sending and a separate portion for receiving, as is well-known in the art. Signal-processing for Doppler signal analysis is well-known. The two modes of DDT operation, described as finding the solution to equations (4) or (6) can be implemented either by an iterative calculation performed with microprocessors, or by algorithms using the measured quantities to approximate the exact solutions. In addition, the value for the velocity v obtained from equation (4) can be checked using equation (6), and the value of the velocity v obtained from equation (6) can be checked by using equation (6) at different frequencies f.

It will be understood that the embodiments described herein, including the values given for the width of the strips of piezoelectric material and the width of the nonconducting gaps between the polarized strips, is merely exemplary and that a person skilled in the art may make many variations and modifications to the described embodiments utilizing functionally equivalent elements to those described. In addition, the embodiments described herein are not limited to medical applications, but can be used in industrial applications such as measuring the velocity of oil flowing through a pipeline. Moreover, while one-dimensional structures such as grids or a simple cylindrical structure such as the banded guide wire described above, have been described, extension to two dimensional diffracting structures, such as checkerboard or "bull's eye" structure, is within the scope of the present invention. Any variations or modifications to the invention described hereinabove are intended to be included within the scope of the invention as defined by the appended claims.

What is claimed is:

1. A method of determining a velocity of a fluid flowing through a lumen, comprising the steps of:

placing a piezoelectric ultrasonic transducer apparatus proximate to said lumen, said ultrasonic transducer apparatus including a diffracting structure comprising a linear array of alternately polarized vibrating elements fabricated from a piezoelectric material which emit and receive a plurality of diffracted ultrasonic beams;

exciting said ultrasonic transducer apparatus to operate at a given frequency to enable said transducer apparatus to emit said plurality of diffracted ultrasonic beams;

measuring the time changes of said plurality of diffracted ultrasonic beams as said plurality of diffracted ultrasonic beams are backscattered by said fluid back towards said diffracting structure to determine said velocity of said fluid.

2. The method according to claim 1, further comprising the steps of:

exciting said ultrasonic transducer apparatus to operate at a frequency different from said given frequency;

determining said velocity at said different frequency; and comparing said velocity determined at said different frequency to said velocity determined at said given frequency for verifying said velocity determined at said given frequency.

3. A method of determining a diameter of a lumen having a first side and a second side through which a fluid under investigation flows, comprising the steps of:

placing a piezoelectric ultrasonic transducer apparatus proximate to said lumen, said transducer apparatus including a diffracting structure comprising a linear array of alternately polarized vibrating elements fabricated from a piezoelectric material which emit and receive a non-diffracted ultrasonic beam;

exciting said ultrasonic transducer apparatus to operate at a given frequency to enable said diffracting structure to emit said non-diffracted ultrasonic beam from said first side of said lumen to said second side of said lumen; and determining said diameter of said lumen as said non-diffracted beam is reflected by said second side of said lumen back towards said first side of said lumen.

4. A method of determining the absolute flow volume of a fluid flowing through a lumen of a given diameter from the product of a velocity of said fluid and an area of said lumen, comprising the steps of:

placing a piezoelectric ultrasonic transducer apparatus proximate to said lumen, said transducer apparatus including a diffracting structure comprising a linear array of alternately polarized vibrating elements fabricated from a piezoelectric material which emit and receive a plurality of diffracted ultrasonic beams, said diffracting structure being further adapted for emitting and receiving a non-diffracted ultrasonic beam;

exciting said ultrasonic transducer apparatus to operate at a first frequency to enable said diffracting structure to emit said plurality of diffracted ultrasonic beams towards said fluid, said ultrasonic transducer apparatus measuring the frequency shift of said plurality of diffracted ultrasonic beams as said plurality of diffracted ultrasonic beams are reflected by said fluid back towards said diffracting structure, thereby determining said velocity of said fluid; and exciting said ultrasonic transducer apparatus at a second frequency to enable said diffracting structure to emit said non-diffracted ultrasonic beam from a first side of said lumen to a second side of said lumen, said ultrasonic transducer apparatus determining said area as said non-diffracted ultrasonic beam is reflected by said second side of said lumen back towards said first side of said lumen;

determining said diameter of said lumen as said non-diffracted beam is reflected by said second side of said lumen back towards said first side of said lumen.

5. An apparatus for determining the velocity of a fluid flowing through a lumen, comprising:

a transducer having a planar substrate member fabricated from a piezoelectric material and a linear array of alternately polarized vibrating elements fabricated from a piezoelectric material formed upon a surface of said planar substrate member, said alternately polarized vibrating elements forming a diffracting structure for emitting a plurality of diffracted ultrasonic beams of at least one given frequency and receiving a plurality of diffracted ultrasonic beams of at least one given frequency;

pulse generation means coupled to said diffracting structure of said transducer, for generating a signal which causes said alternately polarized vibrating elements of said diffracting structure to vibrate and emit said plurality of diffracted ultrasonic beams of said at least one given frequency, so that when said emitted diffracted ultrasonic beams of said at least one given frequency impinge upon the fluid flowing through the lumen at a given velocity, the fluid reflects back said plurality of diffracted ultrasonic beams as a plurality of backscattered diffracted beams of a shifted frequency, said backscattered diffracted beams being received by said alternately polarized vibrating elements of said diffracting structure of said transducer, whereby said backscattered beams cause said alternately polarized vibrating elements to vibrate at said shifted frequency, thereby producing a signal which is indicative of said shifted frequency; and signal processing means associated with said pulse generation means and said transducer for receiving said signal which is indicative of said shifted frequency and comparing it with said at least one given frequency of said emitted diffracted ultrasonic beams to determine the given velocity of the fluid.

6. The apparatus according to claim 5, wherein said pulse generating means includes means for generating a variable signal which causes said diffracting structure to emit a second plurality of diffracted ultrasonic beams at a second given frequency which is different from said at least one given frequency of said plurality of diffracted ultrasonic beams, so that when said second plurality of diffracted ultrasonic beams emitted from said diffracting structure of said transducer impinge upon the fluid flowing through the lumen at said given velocity, the fluid reflects back said second plurality of diffracted ultrasonic beams as a second plurality of backscattered diffracted beams, which are of a second shifted frequency, said backscattered diffracted beams being received by said diffracting structure of said transducer so that the given velocity of the fluid at said at least one given frequency can be verified by said signal processing means.

7. The apparatus according to claim 5, wherein said emitted plurality of diffracted ultrasonic beams comprise two diffracted ultrasonic beams at equal and opposite angles to said diffracting structure and said received plurality of diffracted ultrasonic beams comprise two diffracted ultrasonic beams at equal and opposite angles to said diffracting structure.

8. The apparatus according to claim 7, wherein said pulse generating means comprises a pulse generator having a first terminal and a second terminal, said first terminal including a first lead and a second lead, said first lead being coupled to every other vibrating element of said alternately polarized vibrating elements, said second lead being coupled to vibrating elements of said alternately polarized vibrating elements which are not coupled to said first lead, and said second terminal being coupled to a ground plane of said diffracting structure.

9. The apparatus according to claim 5, wherein said pulse generating means generates two signals which cause said diffracting structure to emit only a non-diffracted ultrasonic beam, said non-diffracted ultrasonic beam being used to measure a given diameter of said lumen when said non-diffracted ultrasonic beam is directed from one side of said lumen to an opposite side of said lumen, said opposite side of said lumen reflecting said non-diffracted ultrasonic beam back towards said diffracting structure of said transducer, thereby enabling the determination of said given diameter, said given diameter being used by said signal processor means to determine an absolute flow volume of said fluid.

10. The apparatus according to claim 9, wherein said pulse generating means comprises:

a first pulse generator having a first terminal and a second terminal, said first terminal being coupled to every other vibrating element of said linear array of alternately polarized vibrating elements and said second terminal being coupled to a ground plane of said diffracting structure; and a second generator having a first terminal and a second terminal, said first terminal of said second pulse generator being coupled to vibrating elements of said linear array of alternately polarized vibrating elements which are not coupled to said first terminal of said first pulse generator, said second terminal of said second pulse generator being coupled to said ground plane of said diffracting structure, wherein said two signals which cause said diffracting structure to emit only a non-diffracted ultrasonic beam are each produced by said first and second pulse generators, said two signals being of the same polarity.

11. The ultrasonic transducer according to claim 5, wherein said piezoelectric plastic of said substrate member comprises PVF2 piezoelectric plastic.

12. The ultrasonic transducer according to claim 5, wherein said piezoelectric plastic of said linear array of vibrating elements comprises PVF2 piezoelectric plastic.

13. The ultrasonic transducer according to claim 5, wherein said piezoelectric plastic of said linear array of vibrating elements and said piezoelectric plastic of said substrate member each comprise PVF2 piezoelectric plastic.

14. An ultrasonic transducer comprising:

a planar substrate member fabricated from a piezoelectric material;

a linear array of alternately polarized vibrating elements fabricated from a piezoelectric material, said linear array of alternately polarized vibrating elements being disposed upon a surface of said planar substrate member, said alternately polarized vibrating elements forming a diffracting structure.

15. The ultrasonic transducer according to claim 14, wherein said piezoelectric plastic of said substrate member comprises PVF2 piezoelectric plastic.

16. The ultrasonic transducer according to claim 14, wherein said piezoelectric plastic of said linear array of alternately polarized vibrating elements comprises PVF2 piezoelectric plastic.

17. The ultrasonic transducer according to claim 14, wherein said piezoelectric plastic of said linear array of alternately polarized vibrating elements and said piezoelectric plastic of said substrate member each comprise PVF2 piezoelectric plastic.

18. The ultrasonic transducer according to claim 14, wherein said alternately polarized vibrating elements are arranged so that every other vibrating element is polarized in a first given direction and remaining ones of said vibrating elements are polarized in a second given direction.

19. The ultrasonic transducer according to claim 18, wherein said vibrating elements polarized in said first given direction are spaced from each other a distance of about 0.05 to 1 times a given ultrasonic wave to be employed.

20. The ultrasonic transducer according to claim 18, wherein said vibrating elements polarized in said second given direction are spaced from each other a distance of about 0.05 to 1 times said given ultrasonic wave to be employed.

* * * * *